T. J. GEE.
APPARATUS FOR CLEARING AND PLOWING FOREST LANDS.
APPLICATION FILED JULY 1, 1911.
1,049,697.
Patented Jan. 7, 1913.
3 SHEETS—SHEET 1.
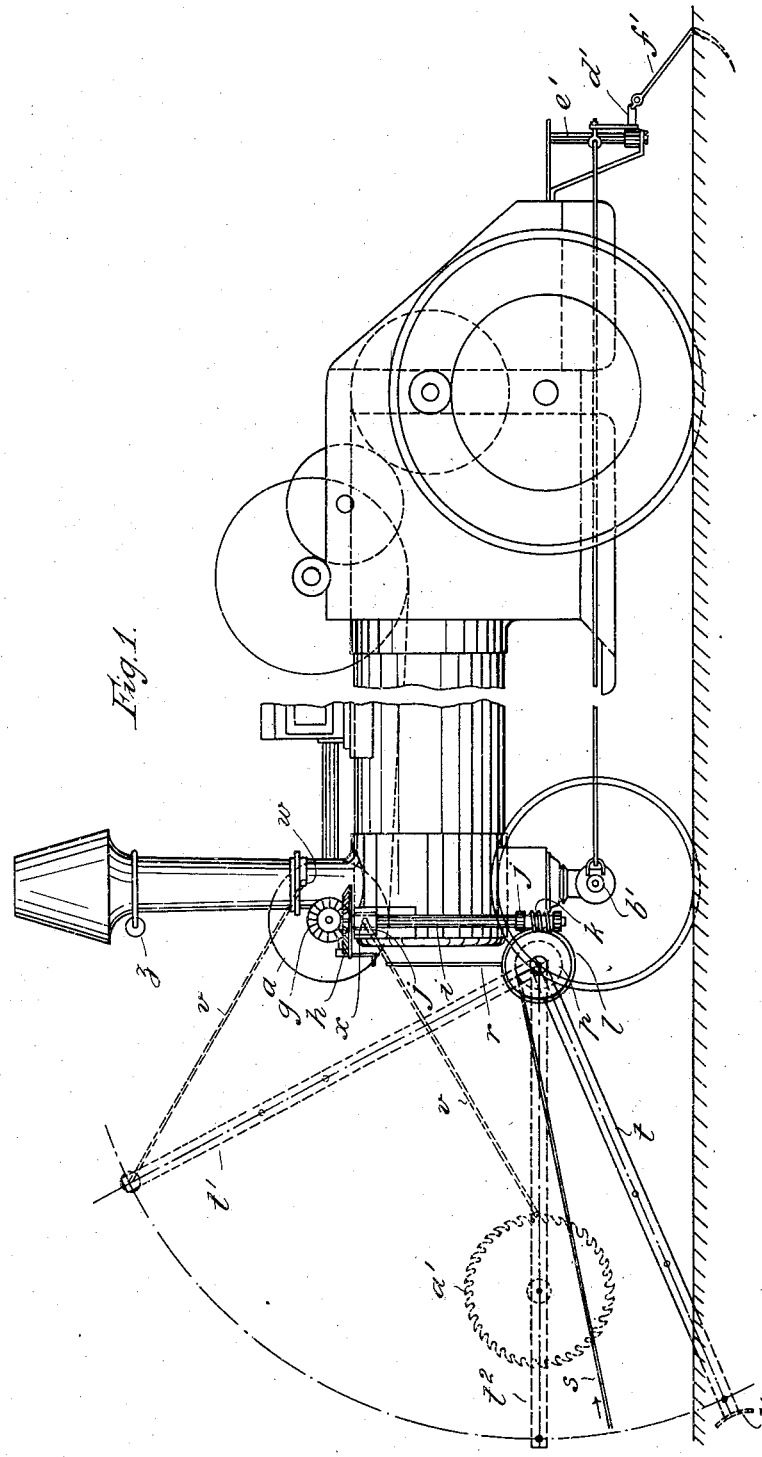
Witnesses:
John N. Hoving.
F. H. Logan.
Inventor:
THOMAS JOHN GEE
By Berrigan
Attorney T. J. GEE.
APPARATUS FOR CLEARING AND PLOWING FOREST LANDS.
APPLICATION FILED JULY 1, 1911.
1,049,697.
Patented Jan. 7, 1913.
3 SHEETS—SHEET 2.
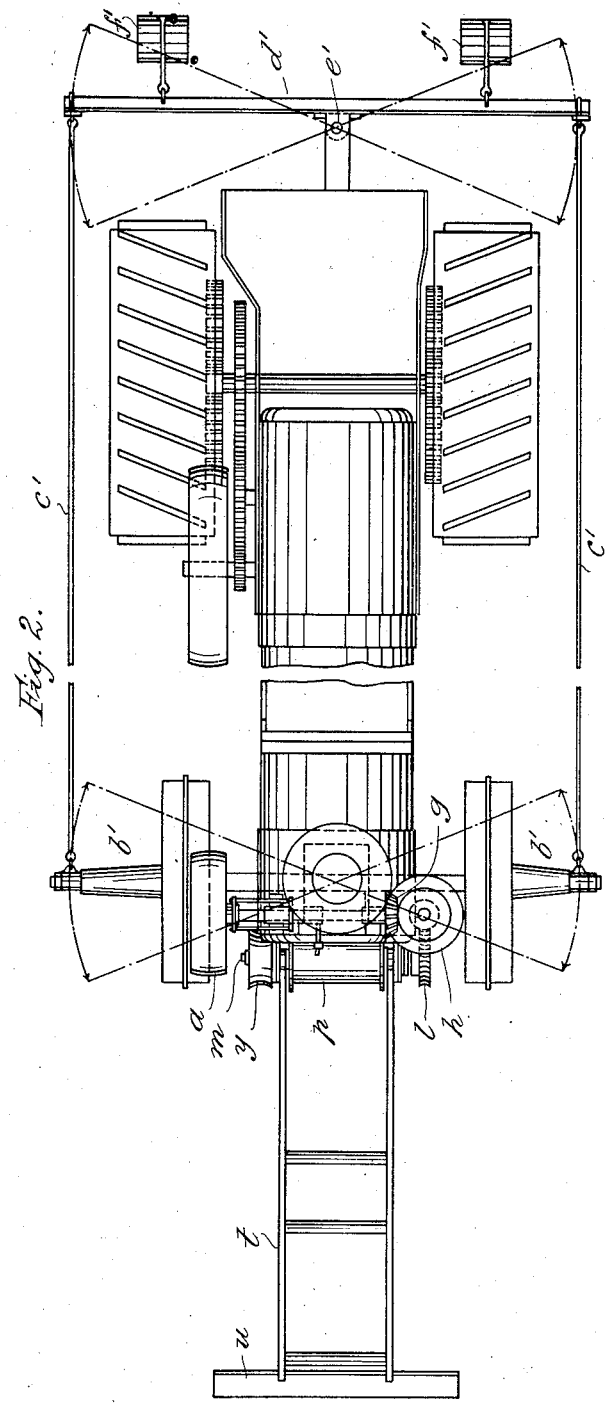

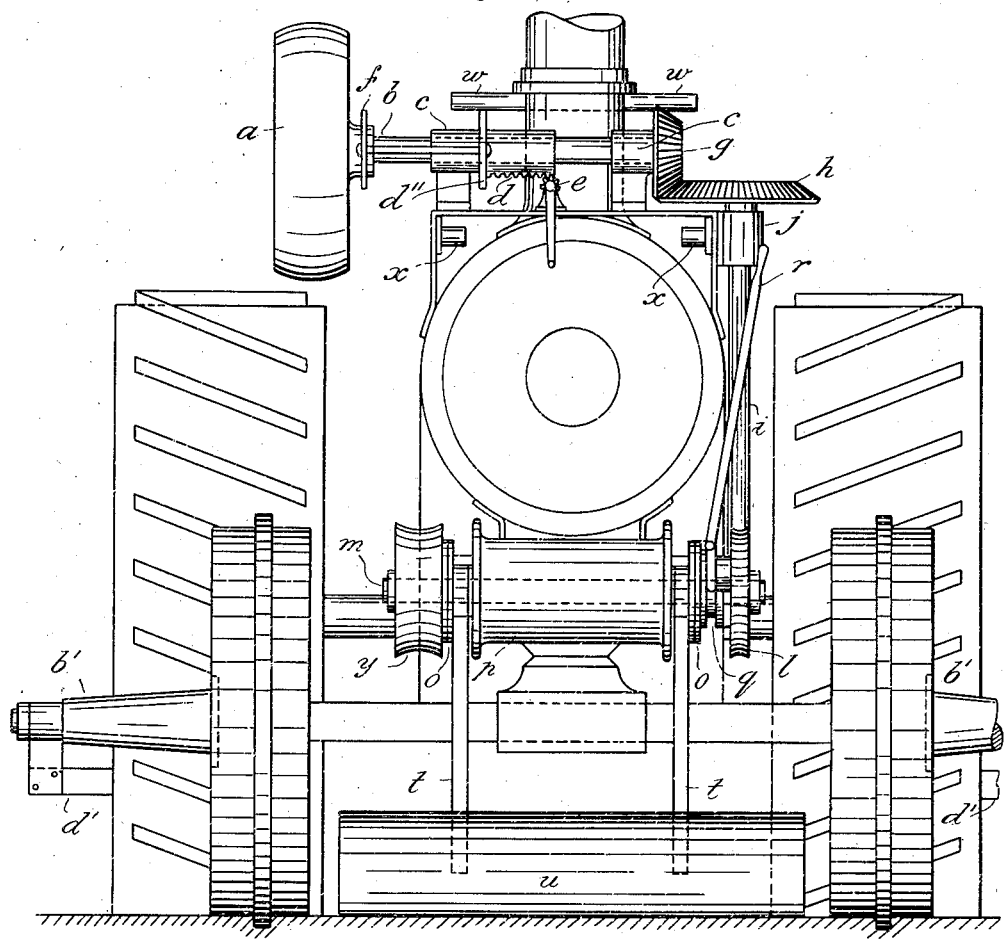

UNITED STATES PATENT OFFICE.

THOMAS JOHN GEE, OF BUENOS AIRES, ARGENTINA.

APPARATUS FOR CLEARING AND PLOWING FOREST-LANDS.

1,049,697. Specification of Letters Patent. Patented Jan. 7, 1913.

Application filed July 1, 1911. Serial No. 636,504.

*To all whom it may concern:*

Be it known that I, THOMAS JOHN GEE, a subject of the King of the United Kingdom of Great Britain and Ireland, and residing at Buenos Aires, Argentina, have invented a certain new and useful Improvement in Apparatus for Clearing and Plowing Forest-Lands, of which the following is a specification.

This invention relates to a power driven vehicle, e. g. a traction engine driven by steam, gas or other motive agent fitted with attachments adapted for use in clearing forest lands and the like of trees and stumps, and thereafter plowing the ground.

In accordance with the invention, the vehicle is provided with an attachment including appliances capable of rapidly pulling or uprooting trees and stumps, said attachment including a framework which may also form the jib member of a crane for removing the heavy trees, or as a support for a saw for sawing the wood; the vehicle is further equipped with a plow or plows and with automatic devices for steering the plow or plows.

Other features will appear from the following description.

In the accompanying drawings Figure 1 is a side elevation of a steam traction engine equipped with the improvements; Fig. 2 is a plan thereof and Fig. 3 is an end elevation, on an enlarged scale, showing details of the stump pulling apparatus.

Referring to the drawings, $a$ is a pulley which is driven from the flywheel of the engine and has a feather key or like connection with a shaft $b$ rotatably mounted in bearings $c$. A sliding sleeve $d$ provided with a rack operated by a pinion $e$ is connected by a plate $d^{11}$ and bolts or the like to a plate $f$ freely mounted on the driving pulley, so that, on rotation of the pinion $e$, the driving pulley $a$ can be moved axially out of alinement with the engine flywheel, and the engine can be used for driving other machinery if required. A bevel pinion $g$ is secured to the shaft $b$ and operates the bevel gear wheel $h$, which wheel is keyed to a vertical shaft $i$ adapted to rotate in bearings $j$. At the lower end of the shaft $i$ is fitted a worm $k$ which operates a worm wheel $l$ on the shaft $m$ of a winding drum $p$, said shaft being mounted in bearings secured to supporting plates $o$. The winding drum $p$ is adapted to be put into and out of gear by means of a sliding clutch $q$ operated by a hand lever $r$, so that a cable $s$ adapted to be anchored at its free end can be wound around the drum $p$ when desired. A framework $t$ which is provided with a curved plate $u$ fits on to the bearings on said plates $o$, and, in conjunction with said plate $u$, serves the purpose of a push pole, when it is desired to uproot or pull stumps, trees and the like.

When it is desired to lift, or saw, the wood, the plate $u$ is removed and the framework $t$ acts as the jib of a crane, as indicated in dotted lines at $t^1$, Fig. 1; or acts as a table or support for a circular saw $a^1$, as indicated in dotted lines at $t^2$, Fig. 1. Tie rods $v$, serve to connect the framework $t$ (when acting as a jib) to lugs $w$ on the chimney base; lugs $x$ are adapted to connect the tie rods $v$ to the engine when the framework is used to support the saw. A windlass $y$ and a pulley $z$ on the top of the chimney are adapted to raise and lower the framework $t$ when the function of the attachment is being altered.

Extension brackets $b^1$ are provided on the front road wheels and are used for steering the plows, through the intermediary of connecting rods $c^1$, and a draw bar $d^1$, which draw bar is adapted to swivel on its pivot pin $e^1$ through an angle corresponding to the angle of movement of the axle of the front road wheels of the engine, whereby the plows are automatically steered over uneven ground, and also when the engine is being directed on a different course, thus avoiding the necessity for lifting the plows out of the ground.

Anchors $f^1$ are adapted to be connected to the draw bar $d^1$, when stumps and trees are being pulled or uprooted.

With means such as above described, large tracts of forest lands can be quickly and cheaply cleared and plowed, a proposition hitherto found to be unprofitable owing to the very heavy cost of performing the work by the slow and expensive process of manual and animal labor.

Having now described my invention what I claim and desire to secure by Letters Patent of the United States is:—

In a power driven vehicle, in combination, an attachment including a framework pivoted on a horizontal axis at one end, a curved plate removably attached to the opposite end of said framework, tie rods connected to said framework, lugs at different points of the engine for engagement with the tie rods for retaining the framework in different positions, and a windlass and pulley for raising and lowering the framework, substantially as described.

In testimony whereof I have signed my name to this specification in the presence of two subscribing witnesses.

THOMAS JOHN GEE.

Witnesses:
WALLACE CRANSTON FAIRWEATHER,
JOHN McCLEARY.